United States Patent
Lee et al.

(10) Patent No.: US 8,450,395 B2
(45) Date of Patent: May 28, 2013

(54) RESIN HAVING SUPERIOR IMPACT STRENGTH AND COLOR, AND METHOD FOR PREPARING THE SAME

(75) Inventors: Se Eun Lee, Seoul (KR); Dong Jo Ryu, Daejeon (KR); Seon Hee Han, Daejeon (KR); Jeong Heon Ahn, Suncheon-si (KR)

(73) Assignee: LG Chem, Ltd., Seoul (KR)

( * ) Notice: Subject to any disclaimer, the term of this patent is extended or adjusted under 35 U.S.C. 154(b) by 91 days.

(21) Appl. No.: 12/943,855

(22) Filed: Nov. 10, 2010

(65) Prior Publication Data

US 2011/0152461 A1    Jun. 23, 2011

(30) Foreign Application Priority Data

Dec. 22, 2009    (KR) .................... 10-2009-0129095

(51) Int. Cl.
*C08L 33/06*    (2006.01)
(52) U.S. Cl.
USPC ............ 523/201; 525/902; 525/309; 525/316
(58) Field of Classification Search
USPC ........................... 525/309, 316, 902; 523/201
See application file for complete search history.

(56) References Cited

U.S. PATENT DOCUMENTS

| | | | | |
|---|---|---|---|---|
| 4,180,529 A | * | 12/1979 | Hofmann | 525/85 |
| 4,186,120 A | * | 1/1980 | Ugelstad | 524/458 |
| 4,999,402 A | | 3/1991 | Yamamoto et al. | |
| 5,216,065 A | * | 6/1993 | Colyer et al. | 524/459 |
| 6,172,135 B1 | * | 1/2001 | Fraser et al. | 523/201 |
| 2005/0215677 A1 | * | 9/2005 | Gaggar et al. | 524/115 |

FOREIGN PATENT DOCUMENTS

| | | |
|---|---|---|
| GB | 2 039 496 A | 8/1980 |
| JP | 2006-131803 | 5/2006 |

OTHER PUBLICATIONS

The Polymer Handbook (2005).*
Lange's Handbook of Chemistry (2005).*

* cited by examiner

*Primary Examiner* — Mark Kaucher
(74) *Attorney, Agent, or Firm* — McKenna Long & Aldridge, LLP

(57) ABSTRACT

Disclosed is a resin having excellent impact resistance and color, and a method of preparing the same, and more specifically, a resin having the excellent impact resistance and color, and a method of preparing the same, in which the resin includes (a) an occlusion seed consisting of i) a base seed including 99.95 to 99 wt % of alkyl methacrylate and 0.05 to 1 wt % of crosslinker, and ii) a copolymer of aromatic vinyl compound and alkyl acrylate occluding the base seed; (b) a polymer core surrounding the occlusion seed; and (c) a polymer shell surrounding the core, and according to the present invention, it is effective in providing a resin having superior impact strength, transparency, and color, in which the resin can be used as an excellent impact modifier when applying on a polymethylmethacrylate resin, and a method of preparing the same.

18 Claims, 1 Drawing Sheet

[Fig. 1]
[Fig. 2]
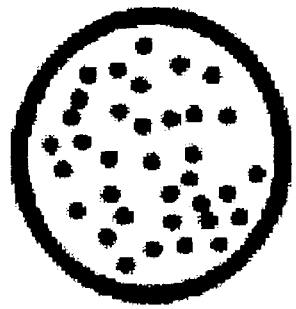

RESIN HAVING SUPERIOR IMPACT STRENGTH AND COLOR, AND METHOD FOR PREPARING THE SAME

CROSS-REFERENCE(S) TO RELATED APPLICATIONS

This application claims priority from Korean Patent Application No. 10-2009-0129095 filed on Dec. 22, 2009, in the Korean Intellectual Property Office, the disclosure of which is incorporated herein by reference in its entirety.

TECHNICAL FIELD

The present invention relates to a resin having excellent impact resistance and color, and a method of preparing the same, and more specifically, to a resin having superior impact strength, transparency, and color, in which the resin can be used as an excellent impact modifier when applying on a polymethylmethacrylate resin, and a method of preparing the same.

BACKGROUND OF THE INVENTION

A polymethylmethacrylate resin (hereinafter called as 'PMMA') has excellent hardness, chemical resistance, surface gross, adhesive, and the like, as well as superior transparency and weathering resistance, so that it is widely used as a substitute for glass. However, since the impact resistance of PMMA resin is low as compared with other plastic material, the thickness of product that is applied with the resin has to be increased for using, or its use is limited to the restrictive fields. Therefore, using an impact modifier was proposed in order to improve the impact resistance of PMMA resin.

JP-A-2006-131803 (Publication date: May 25, 2006) discloses PMMA resin that is modified by using the impact modifier including acrylic rubber, but the impact resistance of the PMMA resin is not a satisfactory level, and there is a problem that causes the hardness and transparency of the PMMA resin to deteriorate when a great quantity of the impact modifier is used for improving the impact resistance.

U.S. Pat. No. 4,999,402 (Registration date: Mar. 12, 1991) discloses a method of improving a processability of transparent resin that is prepared by adding a chain transfer agent when preparing a shell for preparing the transparent resin that is composed of polymethylmethacrylate shell with an acrylic rubber core. However, the transparent resin obtained the above method can be separately processed but the impact strength is not a satisfactory level due to a structural problem, and also there is a problem, of which its use is limited to the thickness of the film level since its transparency is deteriorated because an intercalation reactive index is not controlled.

Meanwhile, the existing impact modifier is not dispersed uniformly when molding, so that the transparency of the molding material is deteriorated. As a result, the thickness of the molding material is limited in order to maintain the transparency.

SUMMARY OF THE INVENTION

In order to solve the problems of the conventional technologies as mentioned above, an object of the present invention is to provide a resin having superior impact strength, transparency, and color, in which the resin can be used as an excellent impact modifier when applying on a polymethylmethacrylate resin, and a method of preparing the same.

Another object of the present invention is to provide a polymethylmethacrylate resin composition including the resin as the impact modifier.

All the objects and other objects of the present invention can be achieved according to the present invention as described as follows:

To achieve the object of the present invention, the present invention provides a resin having excellent impact resistance and color, and a method of preparing the same, in which the resin includes (a) an occlusion seed comprising i) a base seed including 99.95 to 99 wt % of alkyl methacrylate and 0.05 to 1 wt % of crosslinker, and ii) a copolymer of aromatic vinyl compound and alkyl acrylate occluding the base seed; (b) a polymer core surrounding the occlusion seed; and (c) a polymer shell surrounding the core.

In addition, the present invention provides a polymethylmethacrylate resin composition including the resin as the impact modifier.

DETAILED DESCRIPTION

Hereinafter, the present invention will be described in more detailed as the follows.

The impact strength and transparency of the transparent resin are affected by size, composite and content of rubber particle in the resin. Therefore, when the content of rubber particle in the resin is low or the size of rubber particle is small, the transparency is improved but the impact strength is deteriorated; on the contrary, when the content of rubber particle in the resin is high or the size of rubber particle in the resin is large, the impact strength is improved but the transparency is deteriorated. Therefore, the inventors confirmed that the impact strength and transparency are highly improved when the resin has the morphology, in which the rubber particle is occluded in the seed, so that the inventors can finish the present invention based on the problems as mentioned above.

The resin having excellent impact resistance and color includes (a) the occlusion seed comprising i) the base seed including 99.95 to 99 wt % of alkyl methacrylate and 0.05 to 1 wt % of crosslinker, and ii) the copolymer of aromatic vinyl compound and alkyl acrylate occluding the base seed; (b) a polymer core surrounding the occlusion seed; and (c) a polymer shell surrounding the core.

The term, "occlusion" of the present invention means that the space or gap inside crosslinked polymer particles is filled with other polymer particles.

The alkyl methacrylate is preferably methyl methacrylate; in this situation, the resin obtained has an excellent optical transmittance.

The base seed is preferably composed of 99.95 to 99 wt % of alkyl methacrylate and 0.05 to 1 wt % of crosslinker. When the crosslink of the base seed is properly performed within the above range, the seed having desired morphology and then finally the resin having desired morphology can be prepared by controlling a feed rate of monomers when preparing the occlusion seed (polymerizing alkyl methacrylate rubber).

The crosslinker is preferably one or more selected from the group consisting of 3-butandiol diacrylate, 1,3-butandiol dimethacrylate, 1,4-butandiol diacrylate, 1,4-butandiol dimethacrylate, allyl acrylate, allyl methacylate, trimethylolpropane triacrylate, tetraethyleneglycol diacrylate, tetraethyleneglycol dimethacrylate and divinylbenzene. The copolymer of aromatic vinyl compound and alkyl acrylate occluding the base resin, and the polymer core preferably include 0.05 to 1 wt % of the crosslinker; the morphology within the above range can be effectively controlled, and then the resin obtained has an excellent impact strength.

The aromatic vinyl compound and alkyl acrylate in the occlusion seed may be preferably identical to the aromatic vinyl compound and alkyl acrylate of the polymer core.

FIG. 1 and FIG. 2 are roughly examples of the morphologies of the occlusion seed according to the present invention and the polymer core surrounding the occlusion seed. As shown in FIG. 1 and FIG. 2, the white part inside particle refers to the base resin, black spots inside particle refer to occlusion polymers, and black band outside of particle refers to core layer.

The average diameter of the occlusion seed may be preferably 100 to 220 nm, and more preferably 140 to 200 nm; it is excellently effective in the technical properties and transparency within the above range.

The average diameter of the occlusion polymer (black spots) may be preferably 0.1 to 10 nm and more preferably 0.5 to 5 nm; the technical properties and transparency within the above range are excellent.

The polymer particles are occluded inside base seed, so that the base seed is not growing largely due to the crosslinked structure when changing the occlusion seed.

The polymer core is preferably copolymer of aromatic vinyl compound and alkyl acrylate; in this situation, the refractive index is controlled, so that it is excellently effective in the transparency.

The shell is preferably copolymer of methylmethacrylate and alkyl acrylate, or copolymer of aromatic vinyl compound and alkyl acrylate; in this situation, it is excellently effective in the color.

Total 1 to 30 wt % of the occlusion seed, 10 to 60 wt % of the polymer core and 10 to 80 wt % of the polymer shell are preferably; within the above range, it is excellently effective in the transparency and impact strength.

The refractive indexes of the seed, core and shell may be preferably 1.48 to 1.50, respectively; within the above range, it is excellent effective in the transparency of the obtained resin.

Preferably, the shell may not include the crosslinker; in this situation, it is excellently effective in the dispersability.

Each intercalation refractive index in the resin is regularly controlled, and the resin has a seed having structure, in which the rubber is occluded inside resin, so that the transparent resin composition having excellent transparency and color, and improved impact strength may be provided when the resin is applied to the polymethylmethacrylate resin as the impact modifier.

The method of preparing the resin having excellent impact resistance and color according to the present invention includes (a) preparing the base seed by polymerizing 99.95 to 99 wt % of alkyl methacrylate and 0.05 to 1 wt % of the crosslinker; (b) preparing the occlusion seed by infiltrating aromatic vinyl compound and alkyl acrylate inside the base seed, and then injecting a fat-soluble initiator; (c) preparing the polymer core surrounding the occlusion seed; and (d) the polymer shell surrounding the polymer core.

The crosslinker, the polymer core and the polymer shell related to the method are identical to the description about the resin.

The fat-soluble initiator may be infiltrated inside the base seed, and then polymerizes alkyl methacrylate that is already infiltrated inside the based seed, so that the seed (the occlusion seed) occluded by alkyl methacrylate rubber can be prepared.

The fat-soluble initiator is preferably one or more selected from the group consisting of peroxide-based initiator and hydroperoxide-based initiator; in this situation, it is excellently effective in the infiltration inside the base seed.

5 to 20 wt % of the alkyl acrylate and aromatic vinyl compound based on total weight of the resin is preferably injected at one time or batch before polymerizing in the step of preparing the occlusion seed; in this situation, the morphology (occluded structure) that can improve all of the impact strength and transparency can be made.

When the amount of monomers that is injected at one time or batch way is controlled, the amount of monomers that is injected inside seed is determined, thereby determining the amount of occlusion.

The polymer core is preferably prepared by polymerizing the aromatic vinyl compound and alkyl acrylate under presence of the occlusion seed.

The polymer core is preferably prepared by polymerizing while continuously injecting the monomers that consist in the core components; in this situation, the morphology (occluded structure) that can improve all of the impact strength and transparency can be made.

The polymer core may be preferably polymerized by using the fat-soluble initiator.

The shell may be preferably the copolymer of alkyl acrylate and methylmethacrylate, or copolymer of aromatic vinyl compound and alkyl acrylate.

The shell may be preferably polymerized under presence of one or more chain transfer agent selected from the group consisting of t-dodecyl mercaptan (tertiary-dodecyl mercaptan) and n-octyl mercaptan.

The preparing of the seed, core, and shell preferably uses a multi-step emulsion polymerization.

The polymethylmethacrylate resin composition according to the present invention includes the polymethylmethacrylate resin and the resin as the impact modifier.

BRIEF DESCRIPTION OF THE DRAWINGS

The above and other objects, features and advantages of the present invention will become apparent from the following description of preferred embodiments given in conjunction with the accompanying drawings, in which:

FIG. 1 is a concept drawings roughly showing an example of morphology of a first and second seed layers according to the present invention; and FIG. 2 is a concept drawing roughly showing another example of morphology of a first and second seed layers according to the present invention.

BEST MODE FOR CARRYING OUT THE INVENTION

Hereinafter, the preferable Examples will be described for understanding the present invention, but the following Examples are just examples, and it is an obvious fact to the skilled person who are in this field that various modifications and amendments cab be possible within the scope and spirits of the present invention, and also the modifications and amendments are belong to the appended claims.

EXAMPLE

Example 1

<Preparation of First Base Seed>

911 g of ion-exchanged water was injected into a reactor, and then the temperature of the ion-exchanged water was increased up to 70° C. with nitrogen washout. When the temperature of the ion-exchanged water reaches 70° C., 10 g of sodium dodecyl sulfate (SLS, 3 wt % solution), 49.8 g of methylmethacrylate (MMA), and 0.1 g of allylmethacrylate (AMA) were injected at the same time.

When the temperature in the reactor was stabilized at 70° C., the polymerization was started by adding 23 g of potassium sulfate (KPS, 3 wt % solution), and the nitrogen washout was continuously performed until the termination of the reaction. At this point, a ratio of obtained first base seed was 5 wt % related to 100 wt % of total monomers that consist in the obtained transparent resin. The average diameter of the obtained first base seed latex was 111.5 nm that is resulted by using N1COMP, a laser light scattering device, and the refractive index was 1.4903.

<Preparation of Final Base Seed>

Firstly, an activation solution was separately prepared by solving 0.19 g of ferrous sulfate (FES), 25.75 g of sodium formaldehyde sulfoxylate (SFS), and 3.50 g of disodium ethylenediamine tetraacetate (EDTA) in 706.8 g of ion-exchanged water. The monomer was emulsified by stirring 38 g of ion-exchanged water, 7.8 g of sodium dodecyl sulfate (10 wt % solution), 99.8 g of methylmethacrylate, and 0.2 g of allyl methacrylate. The emulsified monomer was dropped to the reactor that was finished the polymerization of the first base seed for 1 hour under nitrogen atmosphere of 70° C. and at the same time 10 g of the activation solution and 0.3 g of diisopropylbenzenehydroperoxide (DIPHP, 54 wt % solution) were added to start the polymerization. The aging step was performed for 1 hour by injecting 3 g of the activation solution and 0.1 g of diisopropylbenzenehydroperoxide (DIPHP, 54 wt % solution) after the termination of the reaction. At this point, a ratio of obtained final base seed was 10 wt % related to 100 wt % of total monomers that consist in the obtained transparent resin. The conversion rate of the obtained final base seed latex was 99%, its average diameter was 169.6 nm, and its refractive index was 1.4903.

<Preparation of Occlusion and Polymer Core>

The monomers were emulsified by stirring 236 g of ion-exchanged water, 41 g of sodium dodecyl sulfate (10 wt % solution), 482 g of butyl acrylate, 112 g of styrene, and 6.5 g of allyl methacrylate. 73 g of the emulsified monomer was injected in a batch way under nitrogen atmosphere of 70° C. At 30 minutes after injecting, the polymerization was started by adding 7.9 g of the activation solution and 0.3 g of diisopropylbenzenehydroperoxide (DIPHP, 54 wt % solution). At 30 minutes after decreasing the exothermic peak (or stopping the exothermic reaction), 804.5 g of the remaining emulsified monomer was dropped for 2 hours and at the same time, the polymerization was started by injecting 87.1 g of the activation solution and 1 g of diisopropylbenzenehydroperoxide (DIPHP, 54 wt % solution). The aging step was performed for 1 hour by injecting 29 g of the activation solution and 1 g of diisopropylbenzenehydroperoxide (DIPHP, 54 wt % solution) after the termination of the reaction. At this point, a ratio of obtained polymer core was 60 wt % related to 100 wt % of total monomers that consist in the obtained transparent resin. The conversion rate of the obtained polymer core latex was 99%, its average diameter was 295.9 nm, and its refractive index was 1.4903.

<Preparation of Polymer Shell>

95 g of ion-exchanged water, 19.4 g of sodium dodecyl sulfate (10 wt % solution), 237.5 g of methylmethacrylate, 12.5 g of methyl acrylate, and 0.75 g of n-octyl mercaptan were dropped to the polymer core latex for 2 hours. When the temperature in the reactor was stabilized at 70° C., the polymerization was started by adding 24 g of the activation solution and 0.7 g of diisopropylbenzenehydroperoxide (DIPHP, 54 wt % solution). The aging step was performed for 1 hour by injecting 10 g of the activation solution and 0.5 g of diisopropylbenzenehydroperoxide (DIPHP, 54 wt % solution) after the termination of the reaction, and the nitrogen washout was continuously performed until the termination of the reaction. At this point, a ratio of obtained polymer shell was 25 wt % related to 100 wt % of total monomers that consist in the obtained transparent resin. The conversion rate of the obtained polymer shell latex was 99%, its average diameter was 318.9 nm, and its refractive index was 1.4903.

<Preparation of Transparent Resin>

After the final solid content was decreased to less than 10 wt % by adding ion-exchanged water to the obtained transparent resin latex, the temperature was increased up to 80° C. while slowly stirring by using a stirrer. Calcium chloride solution having the concentration of 22 wt % was injected to prepare a mixture in a slurry type. The temperature was increased above 90° C., aged, and then cooled. The cooled mixture in the slurry type was washed with ion-exchanged water, filtered, and then dried to obtain the transparent resin in a powder state.

<Preparation of Polymethylmethacrylate Resin Composition>

After 40 parts by weight of the obtained transparent resin in the powder state, 60 parts by weight of polymethylmethacrylate resin (IH830 available from LG MMA company), 0.2 parts by weight of a lubricant, 0.1 parts by weight of an antioxidant, and 0.01 parts by weight of a light stabilizer were mixed, the pellet was prepared from the mixture by using a two-axis extruder. And then the pellets were again injection-molded to prepare specimens.

Example 2

The same method used for Example 1 was used, except that the polymerization was performed by injecting at one time (injecting in a batch way) 10 wt % of the monomer that is injected for preparing the occlusion and polymer core based on 100 wt % of the monomers that consist in the obtained transparent resin, and then dropping the remaining monomers with the initiator for 2 hours at 30 minutes after decreasing the exothermic peak.

Example 3

The same method used for Example 1 was used, except that 20 wt % of the base seed, 55 wt % of occlusion and polymer core, and 25 wt % of the polymer shell were used, 0.25 wt % of allyl methacryalte (AMA) that is a crosslinker was used when preparing the base seed, and the polymerization was performed by injecting at one time (injecting in a batch way) 10 wt % of the monomer that is injected for preparing the occlusion and polymer core based on 100 wt % of the monomers that consist in the obtained transparent resin, and then dropping the remaining monomers with the initiator for 2 hours at 30 minutes after decreasing the exothermic peak.

Example 4

The same method used for Example 1 was used, except that 20 wt % of the base seed, 55 wt % of occlusion and polymer core, and 25 wt % of the polymer shell were used, 0.3 wt % of polyethyleneglycol diallylate (PEGDA) that is a crosslinker was used when preparing the base seed, and the polymerization was performed by injecting at one time (injecting in a batch way) 10 wt % of the monomer that is injected for preparing the occlusion and polymer core based on 100 wt % of the monomers that consist in the obtained transparent resin, and then dropping the remaining monomers with the initiator for 2 hours at 30 minutes after decreasing the exothermic peak.

Comparative Example 1

The same method used for Example 1 was used, except that all of monomers were continuously dropped along with the initiator for the polymerization, without injecting a part of monomers in advance before the polymerization when preparing the occlusion and polymer core.

Comparative Example 2

The same method used for Example 1 was used, except that the crosslinker was not used when preparing the seed, and the polymerization was performed by injecting at one time (injecting in a batch way) 10 wt % of the monomer that is injected for preparing the occlusion and polymer core based on 100 wt % of the monomers that consist in the obtained transparent resin, and then dropping the remaining monomers with the initiator for 2 hours at 30 minutes after decreasing the exothermic peak.

Comparative Example 3

The same method used for Example 1 was used, except that 2 we % of allyl methacrylate (AMA) was used as the crosslinker when preparing the seed, and the polymerization was performed by injecting at one time (injecting in a batch way) 10 wt % of the monomer that is injected for preparing the occlusion and polymer core based on 100 wt % of the monomers that consist in the obtained transparent resin, and then dropping the remaining monomers with the initiator for 2 hours at 30 minutes after decreasing the exothermic peak.

Comparative Example 4

A transparent acrylonitrile-butadiene-styrene resin (TR-558A available from LG Chemicals corp.) was injection-molded to prepare a specimen.

[Testing Example]

The properties of the transparent resins prepared from Examples 1 to 4 and Comparative Examples 1 to 4 were measured by the methods as follows and the results were shown in the following Table 2:

Refractive Index—After preparing a thin film having the thickness of 0.2 mm from the transparent resin, the refractive index was measured by using Abbe Refractometer at 25° C. according to ASTM D1298.

impact Strength—Izod impact strength was measured according to ASTM D256 using the specimen having the thickness of ⅛".

Transparency, Haze—The transparency was measured according to ASTM D1003 using the injection-molded thin plate products having the thickness of 3 mm.

Color—□b value (difference in yellowness) was measured by using Color Quest II (available from Hunter Lab company).

Hardness—The hardness was measured by using Rockwell 2000 (available from Instron Company).

TABLE 1

| Classification | | Transparency (%) | Haze (%) | Impact Strength (kg · cm/cm) | Hardness | Color (YI) |
|---|---|---|---|---|---|---|
| Examples | 1 | 93.0 | 1.1 | 5.7 | 115 | 0.8 |
| | 2 | 93.2 | 1.0 | 6.3 | 116 | 0.6 |
| | 3 | 93.4 | 1.0 | 7.0 | 117 | 0.5 |
| | 4 | 93.6 | 0.8 | 7.8 | 116 | 0.2 |
| Comparative Examples | 1 | 93.0 | 1.5 | 6.0 | 114 | 1.0 |
| | 2 | 92.8 | 1.8 | 5.0 | 112 | 1.3 |
| | 3 | 92.7 | 1.3 | 6.5 | 116 | 1.2 |
| | 4 | 90.3 | 2.0 | 10.2 | 102 | 0.8 |

As shown in above Table 1, it could be confirmed that the polymethylmethacrylate resin composition according to the present invention (Examples 1 to 4) including the resin according to the present invention as the impact modifier has low Haze, and the excellent transparency, impact strength, hardness, and color as compared to the case without the occlusion seed (Comparative Example 1), the case having seed without the crosslinker (Comparative Example 2), the case having high rate of crosslink (Comparative Example 3), and the case of ABS resin (Comparative Example 4).

From these results, it could be confirmed that the present invention is effective in providing the resin having the superior color, transparency, and impact strength, and the method of preparing the same, in which the resin can be used as an excellent impact modifier when applying on a polymethylmethacrylate resin.

What is claimed is:

1. A resin comprising:
   (a) an occlusion seed comprising i) a base seed including 99.95 to 99 wt % of alkyl methacrylate unit and 0.05 to 1 wt % of a crosslinker unit, and ii) a copolymer of an aromatic vinyl compound and an alkyl acrylate occluded inside the base seed;
   (b) a polymer core surrounding the occlusion seed; and
   (c) a polymer shell surrounding the core,
   wherein the copolymer occluded inside the base seed, has an average diameter of 0.1 to 10 nm.
2. The resin of claim 1, wherein the alkyl methacrylate is methyl methacrylate.
3. The resin of claim 1, wherein the crosslinker is at least one selected from the group consisting of 1,3-butandiol diacrylate, 1,3-butandiol dimethacrylate, 1,4-butandiol diacrylate, 1,4-butandiol dimethacrylate, allyl acrylate, allyl methacrylate, trimethylolpropane triacrylate, tetraethyleneglycol diacrylate, tetraethyleneglycol dimethacrylate and divinylbenzene.
4. The resin of claim 1, wherein the copolymer of aromatic vinyl compound and alkyl acrylate in the occlusion seed comprises 0.05 to 1 wt % of a crosslinker.
5. The resin of claim 1, wherein the polymer core is a copolymer of an alkyl acrylate and an aromatic vinyl compound.
6. The resin of claim 1, wherein the polymer core comprises 0.05 to 1 wt % of a crosslinker.
7. The resin of claim 5, wherein the alkyl acrylate and the aromatic vinyl compound of the occlusion seed, are same monomers as the alkyl acrylate and aromatic vinyl compound of the polymer core, respectively.
8. The resin of claim 1, wherein the shell is a copolymer of methylmethacrylate and an alkyl acrylate, or a copolymer of methylmethacrylate, an alkyl acrylate and an aromatic vinyl compound.

9. The resin of claim 1, wherein the resin comprises 1 to 30 wt % of the occlusion seed, 10 to 60 wt % of the core, and 10 to 80 wt % of the shell.

10. The resin of claim 1, wherein the refractive indexes of the occlusion seed, the polymer core and the polymer shell are 1.48 to 1.50.

11. The resin of claim 1, wherein the shell is not crosslinked by a crosslinker.

12. A method of preparing a resin, comprising:
   (a) preparing a base seed by polymerizing 99.95 to 99 wt % of an alkyl methacrylate and 0.05 to 1 wt % of a crosslinker;
   (b) preparing an occlusion seed by infiltrating an alkyl acrylate and an aromatic vinyl compound into the base seed followed by injecting a fat-soluble initiator,
   wherein the alkyl acrylate and the aromatic vinyl compound for the occlusion seed are added at one time or by batch injection in an amount of 5 to 20 wt% based on total weight of the resin before starting polymerization;
   (c) preparing a polymer core surrounding the occlusion seed; and
   (d) preparing a polymer shell surrounding the polymer core.

13. The method of preparing the resin of claim 12, wherein the crosslinker is at least one crosslinker selected from the group consisting of 1,3-butandiol diacrylate, 1,3-butandiol dimethacrylate, 1,4-butandiol diacrylate, 1,4-butandiol dimethacrylate, allyl acrylate, allyl methacylate, trimethylolpropane triacrylate, tetraethyleneglycol diacrylate, tetraethyleneglycol dimethacrylate and divinylbenzene.

14. The method of preparing the resin of claim 12, wherein the fat-soluble initiator is at least one selected from the group consisting of a peroxide-based initiator and a hydroperoxide-based initiator.

15. The method of preparing the resin of claim 12, wherein the polymer core is prepared by polymerizing an alkyl acrylate and an aromatic vinyl compound in a presence of the occlusion seed.

16. The method of preparing the resin of claim 12, wherein the polymer core is prepared by polymerizing while continuously injecting the monomers for the core.

17. The method of preparing the resin of claim 12, wherein the shell is a copolymer of an alkyl acrylate and a methylmethacrylate, or a copolymer of methylmethacrylate, an alkyl acrylate and an aromatic vinyl compound.

18. A polymethylmethacrylate resin composition, comprising:
   a polymethylmethacrylate resin; and
   the resin of claim 1 as an impact modifier.

* * * * *